United States Patent
Hvolka

[11] Patent Number: 5,356,351
[45] Date of Patent: Oct. 18, 1994

[54] SHUTTLECAR WHEEL END

[75] Inventor: Dusan J. Hvolka, Salt Lake City, Utah

[73] Assignee: Eimco Mining Machinery (Proprietary) Limited, Transvall, South Africa

[21] Appl. No.: 992,453

[22] Filed: Dec. 17, 1992

[30] Foreign Application Priority Data

Dec. 19, 1991 [ZA] South Africa ............ 91/9999

[51] Int. Cl.⁵ ............................................. F16H 3/44
[52] U.S. Cl. ................................. 475/331; 180/255
[58] Field of Search ............... 475/331, 900; 180/255, 180/260; 280/81.6, 95.1

[56] References Cited

U.S. PATENT DOCUMENTS

| | | | |
|---|---|---|---|
| 2,858,897 | 11/1958 | Sibley | 180/255 |
| 2,871,966 | 2/1959 | Dreitzler | 180/255 |
| 2,924,288 | 2/1960 | Lee | 180/255 |
| 3,689,101 | 9/1972 | Spence | 180/255 |
| 4,186,626 | 2/1980 | Chamberlain | 475/331 |
| 4,270,412 | 6/1981 | Beijer et al. | 475/331 |
| 4,271,725 | 6/1981 | Takao et al. | 475/331 |
| 4,424,879 | 1/1984 | Sonzogni | 180/255 |
| 4,482,025 | 11/1984 | Ehrlinger et al. | 180/255 |
| 4,583,425 | 4/1986 | Mann et al. | 475/331 |
| 4,583,428 | 4/1986 | Garnier | 475/331 |
| 4,610,331 | 9/1986 | Rogier et al. | 475/331 |
| 4,616,520 | 10/1986 | Ehrlinger et al. | 475/331 |
| 4,649,772 | 3/1987 | Daniel et al. | 475/331 |
| 4,896,740 | 1/1990 | Hueckler et al. | 180/255 |
| 4,961,485 | 10/1990 | Huff et al. | 475/331 |

*Primary Examiner*—Dirk Wright
*Attorney, Agent, or Firm*—Felfe & Lynch

[57] ABSTRACT

In a shuttlecar wheel end, the wheel unit on which the wheel is mounted is driven by a right angle drive and incorporates first and second planetary gear reduction stages acting sequentially to supply a twice reduced drive to the wheel. Each gear reduction stage has a sun gear meshing with planet gears meshing in turn with a fixed ring gear. The planet gears in each case are carried by a rotatable planet carrier, with the planet carrier of the first reduction stage carrying the sun gear of the second reduction stage. The resulting wheel end is compact in design and does away with the need for an external speed reduction stage.

8 Claims, 4 Drawing Sheets

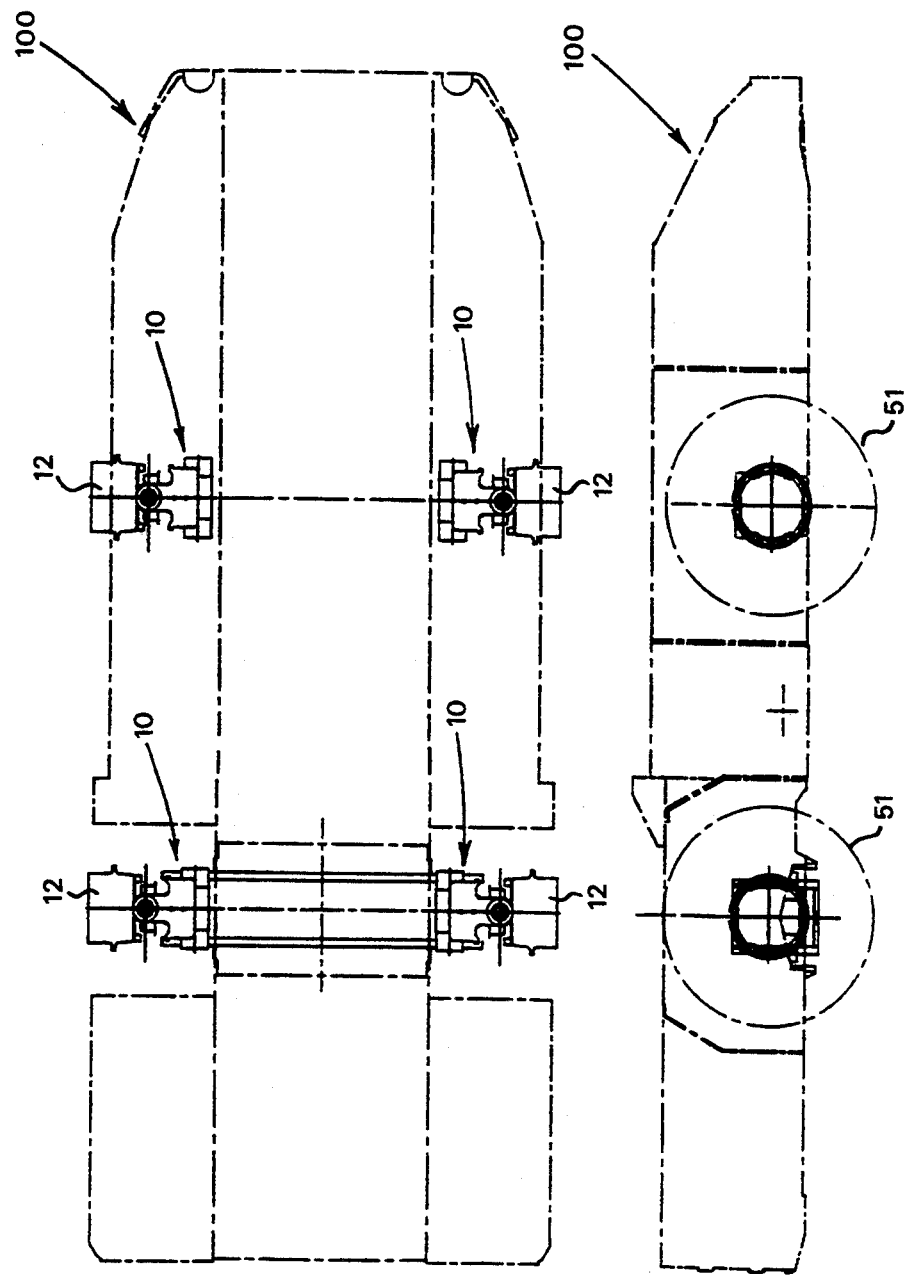

SHUTTLECAR WHEEL END

BACKGROUND TO THE INVENTION

This invention relates to shuttlecar wheel ends and in particular to the wheel units which are used on underground mining shuttlecars and on which the wheels of the shuttlecars are mounted.

In conventional shuttlecar designs, one motor provides drive to the right side wheel units and another motor provides drive to the left side wheel units. In the conventional arrangement there is a three speed reduction system to reduce the high motor speed to the rotational speed driving the wheel units. The first reduction is by a transmission gearbox located adjacent the relevant motor. Drive from the transmission gearbox is transmitted through a drive shaft to a set of bevel gears, serving as a right angle drive and differential, where the second speed reduction takes place. The final speed reduction takes place in the wheel unit itself.

SUMMARY OF THE INVENTION

A first aspect of the invention provides a shuttlecar wheel unit which is adapted to be driven by a right angle drive and which incorporates first and second planetary gear reduction stages acting sequentially.

In the preferred design, the shuttlecar wheel unit has a first gear reduction stage comprising a first, driven sun gear meshing with first planet gears which in turn mesh with a first, fixed ring gear and which are carried by a first planet carrier, and a second gear reduction stage comprising a second sun gear fast with the first planet carrier and meshing with second planet gears which in turn mesh with a second fixed ring gear and which are carried by a second planet carrier, the second planet carrier being fast with a wheel hub adapted for the mounting thereon of a shuttlecar wheel.

Preferably also, the wheel unit comprises park and service brake apparatus for braking the unit. The park brake apparatus may be of the spring applied, hydraulically released type. The service brake may be of the hydraulically applied, spring released type.

A second aspect of the invention provides the combination of a shuttlecar wheel unit as summarised above and a right angle drive unit, the right angle drive unit being arranged to drive the wheel unit via a universal joint, and the wheel unit being independently steerable.

Other aspects of the invention provide a shuttlecar comprising a plurality of wheel units, or a plurality of combinations, as summarised above.

BRIEF DESCRIPTION OF THE DRAWINGS

The invention will now be described in more detail, by way of example only, with reference to the accompanying drawings in which:

FIG. 5 shows a diagrammatic plan view of a shuttlecar to which wheel units of the invention are fitted; and FIG. 6 shows a diagrammatic side view of the shuttlecar seen in FIG. 5.

DESCRIPTION OF A PREFERRED EMBODIMENT

Figure 3:
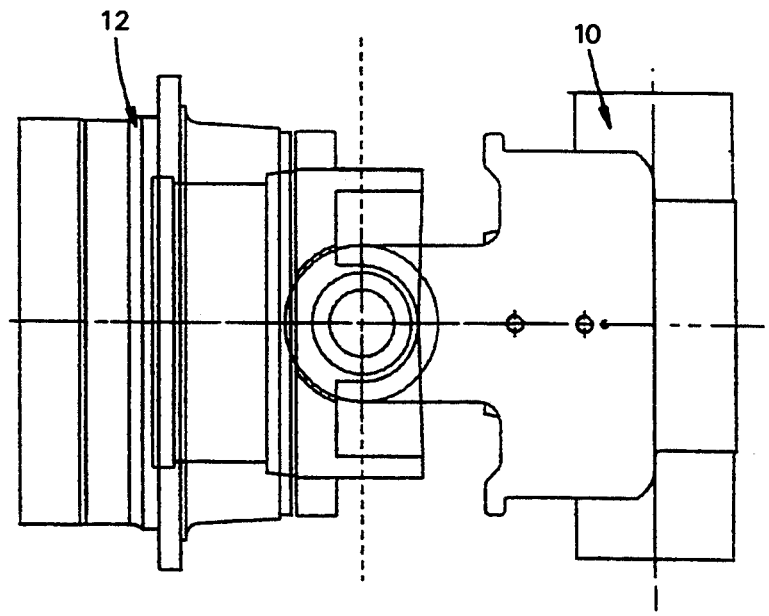
FIG. 3 shows a plan view of the wheel end and illustrates a wheel unit of the invention connected to a right angle drive.

The drawings illustrate a shuttlecar wheel end which includes the right angle drive unit 10 seen on the right hand side of FIG. 3. The unit cooperates with the wheel unit 12 seen on the left hand side in FIG. 3 but is shown exploded away from the wheel unit in the interests of clarity of illustration in FIG. 1.

Figure 1:
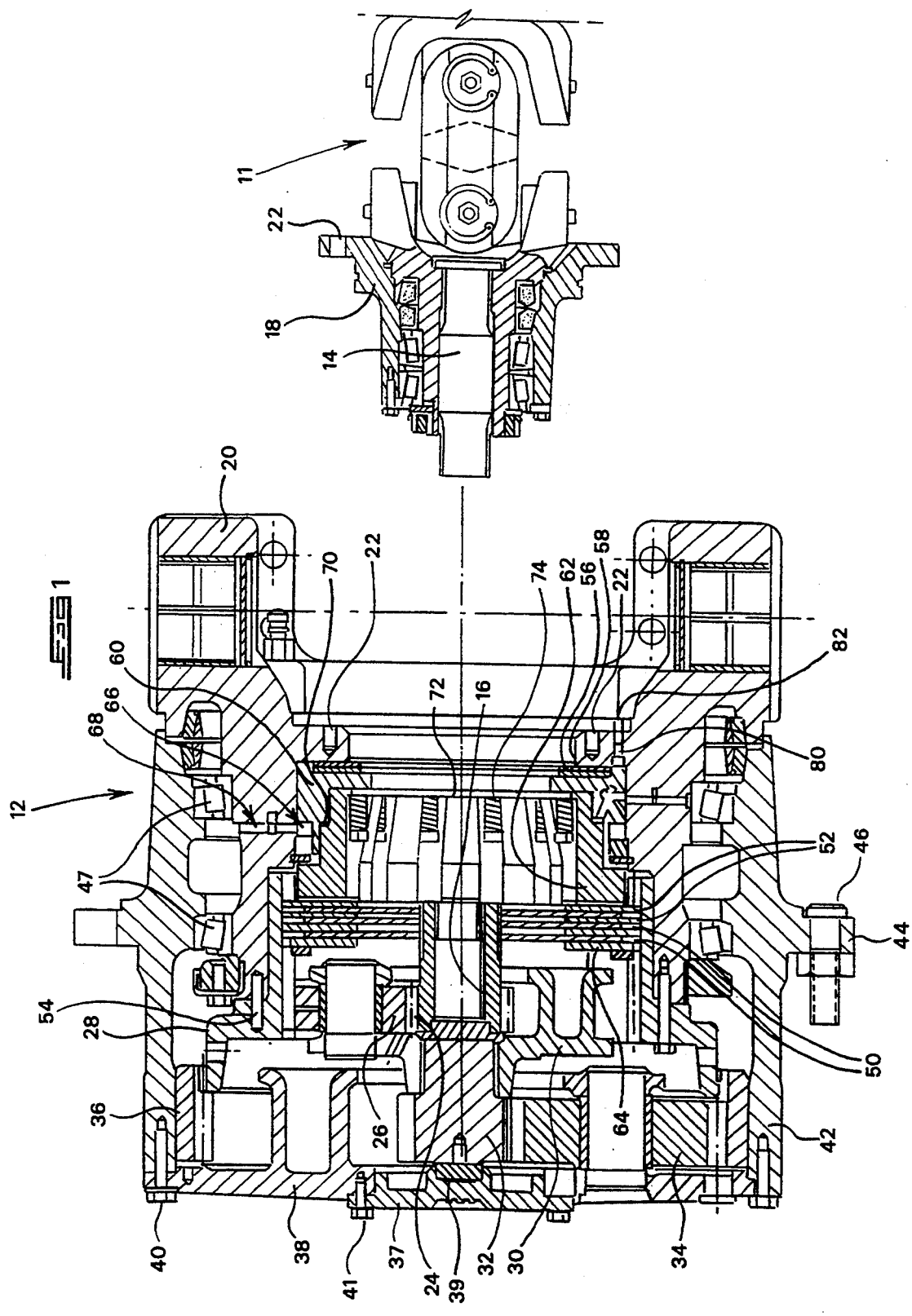
FIG. 1 shows a sectional and partially exploded side view of a shuttlecar wheel end incorporating a wheel unit of the invention.
Figure 2:
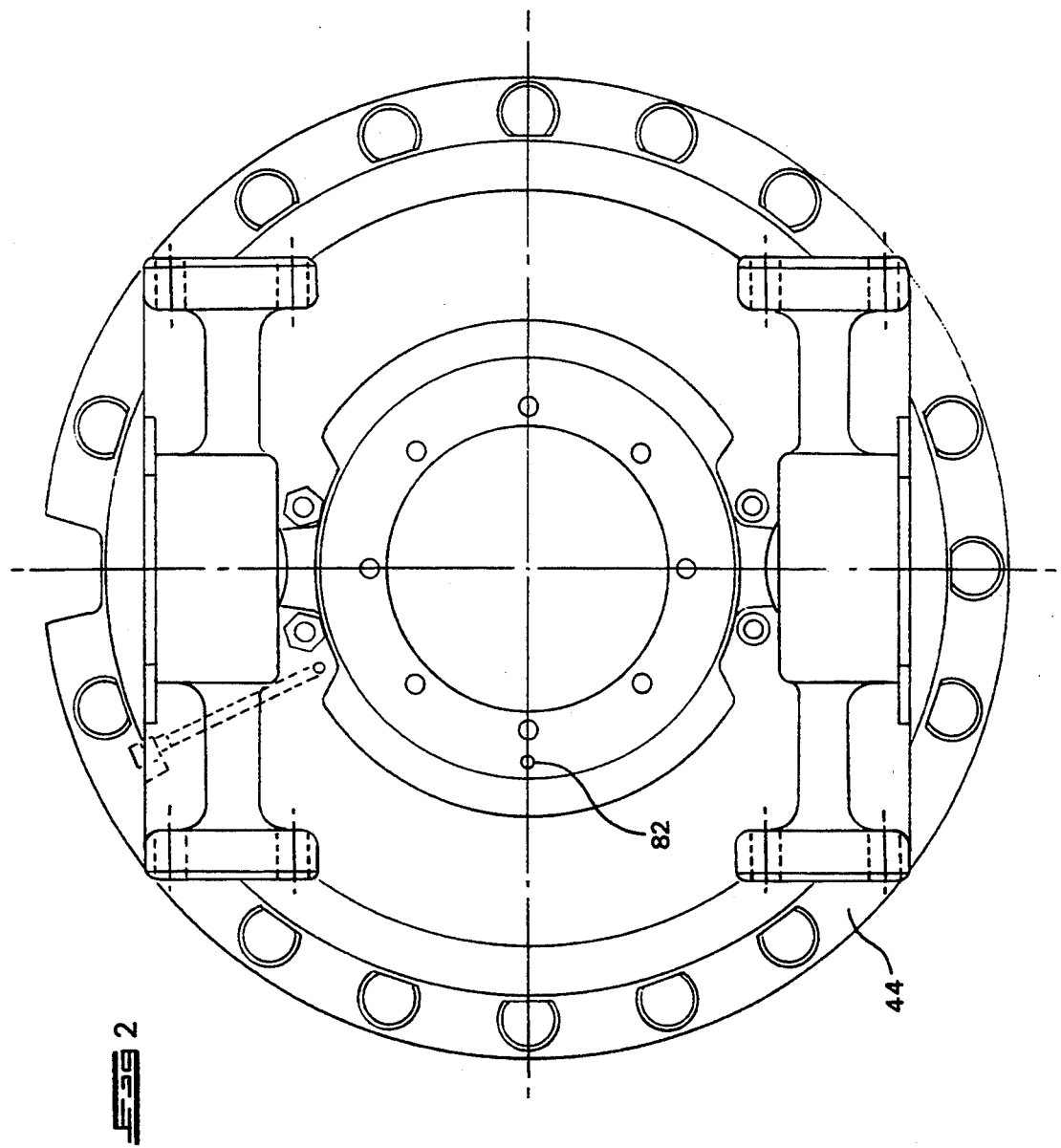
FIG. 2 shows an end view of the wheel end seen in FIG. 1.
Figure 4:
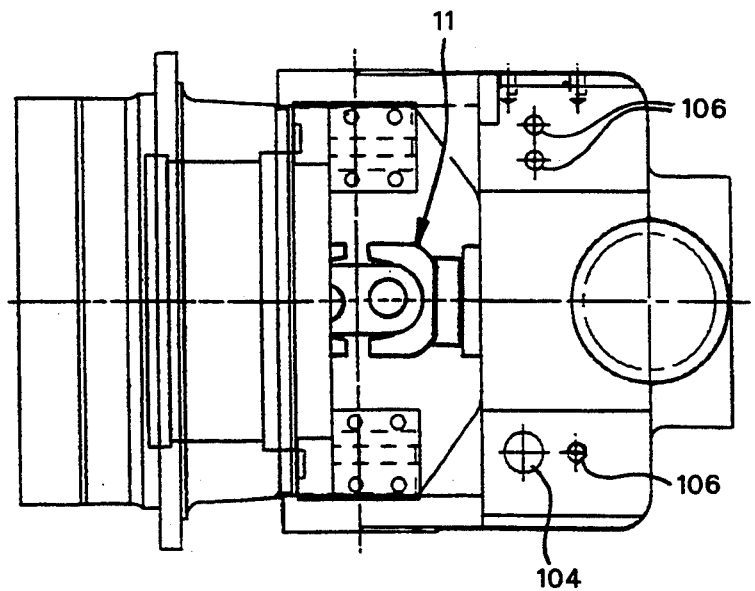
FIG. 4 shows a side view of the wheel end shown in FIG. 3.

The right angle drive unit 10 seen in FIG. 3 includes a universal joint 11 seen in FIG. 4 and supplies drive from a drive shaft which is not visible in FIG. 1 but which extends in the fore-and-aft direction, i.e. into the plane of the paper in FIG. 1, from a prime mover, usually an electric motor. The drive unit 10 supplies drive to the left in FIG. 1 via a shaft 14 which is connected fast to a hollow shaft 16 in the wheel unit 12. The housing 18 of the drive unit 10 is bolted to a fixed spindle bracket 20 of the wheel unit at locations 22.

The hollow shaft 16 of the wheel unit 12 forms a first stage sun gear 24 which meshes with first stage planet gears 26 which in turn mesh with a fixed, first stage ring gear 28. The first stage planet gears 26 are carried by a first stage planet carrier 30 which is fixed to a second stage sun gear 32.

The second stage sun gear 32 meshes with second stage planet gears 34 which in turn mesh with a fixed, second stage ring gear 36. The second stage planet gears are carried by a second stage planet carrier 38. A cover 37 is rotatable on a bearing 39 carried by the sun gear 32 and is secured to the planet carrier 38 by bolts 41.

In operation, with the shaft 16 and hence the first stage sun gear 24 rotating, a rotational drive is supplied to the first stage planet gears 26. The reaction of the first stage planet gears 26 on the first stage ring gear 28 causes the first stage planet carrier 30 to rotate. Accordingly, with appropriate design of the various first stage gears, a first stage speed reduction has been achieved in the wheel unit 12.

The rotation of the first stage planet carrier 30 causes rotation of the second stage sun gear 32 to which it is fixed. The rotation of the second stage sun gear 32 causes rotation of the second stage planet gears 34. The reaction of the second stage planet gears on the fixed, second stage ring gear 36 causes the second stage planet carrier 38 to rotate. Once again, with appropriate design of the various second stage gears, a second stage speed reduction has been achieved.

The second stage planet carrier 38 is fixed by bolts 40 to a tubular hub 42. The hub 42 has a transverse flange 44 to which the rim of a wheel 51 (FIG. 6) can be connected by means of wheel studs 46. The hub 42 is mounted rotatably on the spindle bracket 20 by means of inclined bearings 47.

It will be understood that the initial rotation speed supplied to the shaft 16 by the right angle drive unit 10 via the universal joint 11 has been reduced twice in sequence in the first and second stages, and that a wheel connected to the hub 42 will rotate at the twice reduced speed.

This is considered to be a major advantage over the conventional design described earlier. Since a sequential two stage reduction is achieved within the wheel unit itself, it is possible to do away with the conventional transmission gearbox at the prime mover. It is believed that the omission of a transmission gearbox can lead to a lower overall parts cost and to reduced downtime for gear maintenance.

The illustrated wheel unit incorporates an independent braking system featuring both park and service brake options. Referring again to FIG. 1, the shaft 16 carries a series of rotating friction brake discs 50. The rotating friction discs 50 are interposed between stationary discs 52 which are connected to the first stage ring gear 28. The first stage ring gear 28 is fixed, as stated previously, this being achieved by means of pins 54 that hold the ring gear fast with the spindle bracket 20.

The components and function of the park brake system are as follows. Belleville-type springs 56 act between an inner flange 58 on the spindle bracket 20 and a piston 60, and urge the piston 60 to the left in FIG. 1. The piston acts to the left (as seen in FIG. 1) on an annular member 62 which compresses the various brake discs against a fixed brake reaction plate 64. With the brake discs pressed together a braking action is achieved.

The park brake is released hydraulically by supplying pressurised hydraulic fluid to the fluid chamber 66 on the left hand side (as seen in FIG. 1) of the piston 60 via a supply passage 68. The piston slides to the right (as seen in FIG. 1) and the compressive force is removed from the brake discs. The shaft 16 is now free to rotate.

It will be appreciated that the park brake is of the spring-applied, hydraulically released type. Thus should the hydraulic system fail for any reason, the park brake remains operative.

The service brake is applied during normal running of the shuttlecar by supplying hydraulic fluid to a fluid chamber 70 on the right hand side (as seen in FIG. 1) of a service brake piston 72. The piston 72 moves to the left in FIG. 1 to apply compression to the various brake discs, and the brake is applied. The piston is released by compression springs 74 after a braking operation. Thus in this case, the brake is of the hydraulically applied, spring released type.

Each wheel unit of the shuttlecar has an independent park and service brake feature as described above. The provision of independent brakes for each wheel unit is considered to be advantageous in that the integrity of the braking of the shuttlecar is not reliant on the integrity of other connections, such as propshafts and so forth.

A feature of the braking system is the facility for detecting excessive wear of the friction discs. The system includes a pin 80 arranged to slide in a bore in the inner flange 58 of the spindle bracket 20 and to bear upon the piston 60. The length of the pin 80 is such that, with the park brake applied, full depression of the pin into the bore until it bears upon the piston 60 leaves a portion of the pin projecting. As wear of the brake discs takes place, the pin can be pushed further and further into the bore. When the situation is reached that the head 82 of the pin is flush with or below the surface of the flange 56 when fully depressed, this is an indication that brake disc replacement is necessary.

A further advantage of the illustrated wheel unit arises out of the use of a universal joint 11 and a right angle drive unit 10, namely the fact that a universal joint allows the wheel unit to be steered independently of other wheel units.

FIGS. 5 and 6 of the drawings diagrammatically illustrate an underground coal shuttlecar 100 and show the positions of the wheel units 12 of the invention. It will be noted in FIG. 5 that two of the wheel units 12 are carried at the ends of a transverse equaliser 102. The equaliser 102 is described in detail in the specification of a co-pending patent application filed simultaneously with the present application by the same applicant and the disclosure of which is incorporated herein by reference.

Referring again to FIG. 4, it will be noted that the drive unit 10 is formed with various horizontal bores indicated by the numerals 104 and 106. In the case of the relevant wheel units, the bore 104 receives a shear pin engaged with one transverse member of the equaliser 102, the nature of such transverse member being described in detail in the co-pending patent application referred to above. The bores 106 receive bolts engaged with the same equaliser member. The bolts and shear pin transfer applied shear and other loads from the shuttlecar body to the wheel units.

A similar array of bores is provided on the opposite side of the unit 10, which in practice locates between the ends of the equaliser as seen in FIG. 5. From this Figure, it will be appreciated that the drive units 10 also act as a support structures for the wheel units 12.

I claim:

1. A shuttlecar wheel assembly comprising:

an output shaft operatively associated with drive means and being driven in rotational movement thereby;

a wheel end unit engaged with said output shaft;

steerable support means supporting the wheel end unit and enabling steering movement of the wheel end unit relative to the drive means;

said output shaft including steerable transmitting means for transmitting rotational movement to the wheel end unit while permitting steering movement of the wheel end unit relative to said output shaft;

said wheel end unit comprising a first planetary gear reduction stage having a sun gear fixedly engaged with the output shaft and driven thereby;

a second planetary gear reduction stage operatively engaging said first planetary gear reduction stage;

a hub operatively engaging the second planetary gear reduction stage and having an outer wheel mounted thereon, said first and second planetary gear reduction stages providing sequential speed reductions between the output shaft and the hub.

2. A shuttlecar wheel assembly according to claim 1 and said steerable transmitting means comprising a universal joint connecting with said drive means and allowing relative steering movement of the wheel relative to the drive means while imparting rotation to said hub and outer wheel.

3. The shuttlecar wheel assembly according to claim 2, further comprising a brake system, said brake system comprising:

first brake discs fixedly supported with respect to the shuttlecar;

second brake discs fixedly secured on the output shaft adjacent the sun gear of the first planetary gear reduction stage; and means for selectively causing the first and second brake discs to press against each other and brake the wheel unit.

4. The shuttlecar wheel assembly according to claim 3 and said means for selectively causing the brake discs to press against each other including a spring means biasing said discs together and means for selectively moving said discs apart.

5. The shuttlecar wheel assembly according to claim 4 and said means for selectively moving being a hydraulic system.

6. The shuttlecar wheel assembly according to claim 3 and said means for selectively causing said brake discs to press against each other including a spring biasing said discs apart and means for selectively moving the discs together against the biasing of the spring.

7. The shuttlecar wheel assembly according to claim 6 and said means for selectively moving being a hydraulic system.

8. The shuttlecar wheel assembly according to claim 3 and said first planetary gear reduction stage having a first planet carrier rotatably supporting first planet gears meshing with the sun gear and with a first ring gear fixedly supported relative to the shuttlecar;

said second planetary gear reduction stage including a second sun gear fixedly connected with the first planet carrier and moving rotatably therewith, and a second planet carrier having second planet gears meshing with said second sun gear and a second ring gear fixedly supported relative to the shuttlecar; and said second planetary carrier being fixedly engaged with said hub.

* * * * *